A. R. PARTRIDGE.
SMELTER.
APPLICATION FILED DEC. 21, 1910.

1,025,922.

Patented May 7, 1912.
4 SHEETS—SHEET 2.

A. R. PARTRIDGE.
SMELTER.
APPLICATION FILED DEC. 21, 1910.

1,025,922.

Patented May 7, 1912.

4 SHEETS—SHEET 4.

Attest:
Bent. W. Stahl
Edward N. Saxton

Inventor
Allen R. Partridge.
by Spear, Middleton, Donaldson & Spear
Attys

UNITED STATES PATENT OFFICE.

ALLEN R. PARTRIDGE, OF DENVER, COLORADO, ASSIGNOR TO PARTRIDGE SMELTING AND REFINING COMPANY, OF DENVER, COLORADO, A CORPORATION.

SMELTER.

1,025,922.  Specification of Letters Patent.  Patented May 7, 1912.

Application filed December 21, 1910. Serial No. 598,558.

*To all whom it may concern:*

Be it known that I, ALLEN R. PARTRIDGE, a citizen of the United States, residing at Denver, Colorado, have invented certain new and useful Improvements in Smelters, of which the following is a specification.

My invention relates to a new and improved device for the treatment and reduction of ore by fire.

The invention is demonstrated by the drawings accompanying this specification.

Figure 1:
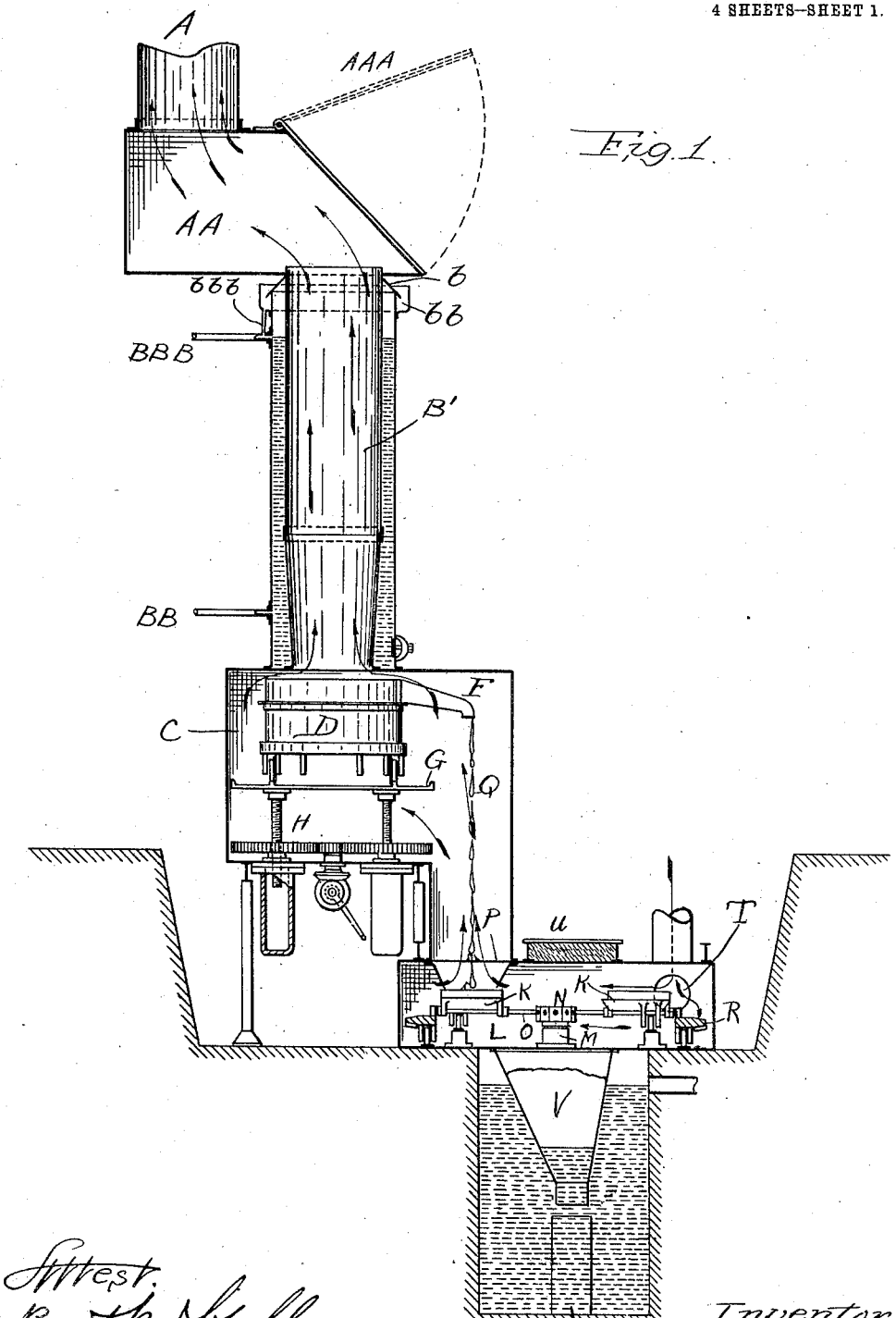
Figure 2:
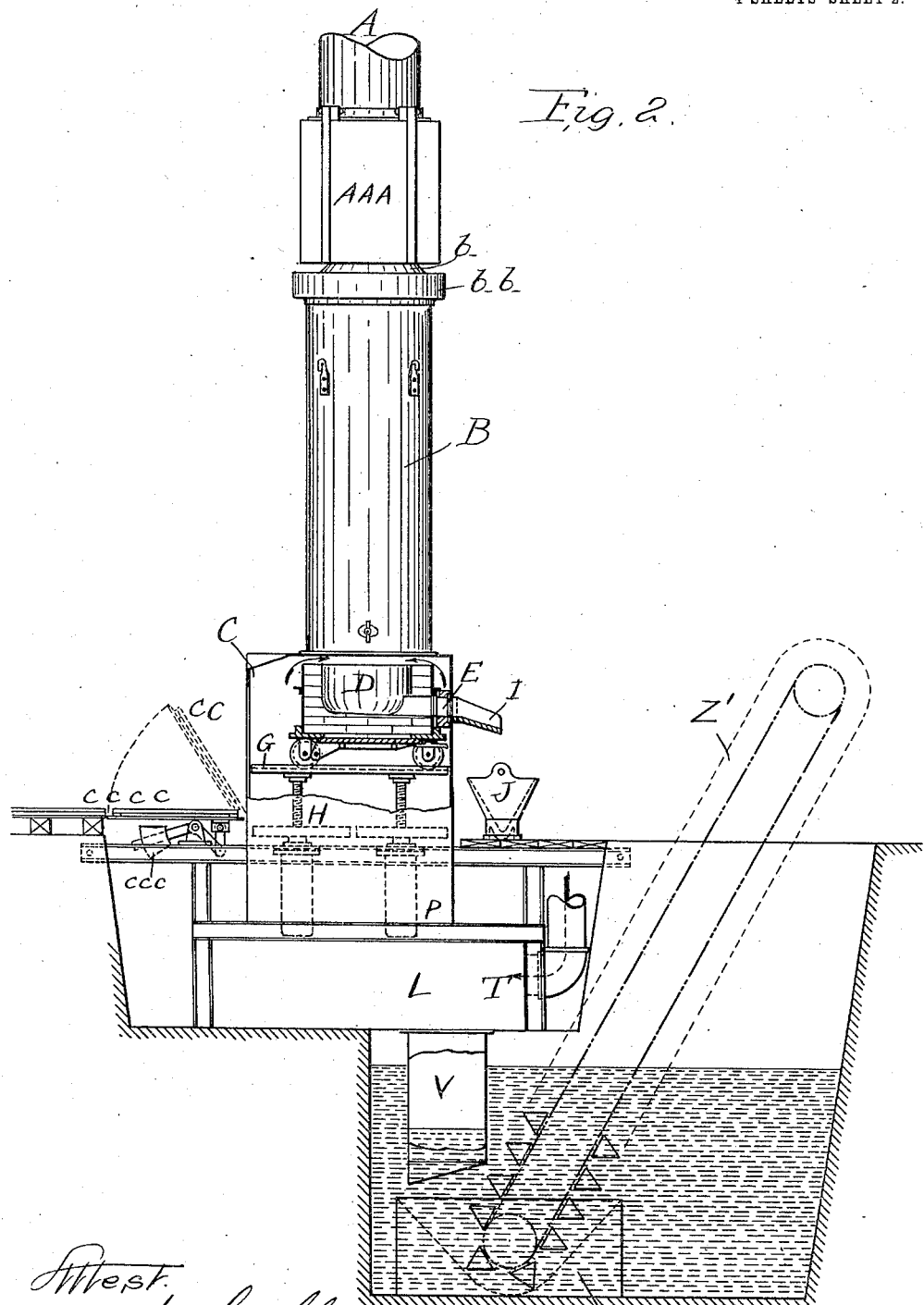
Figure 3:
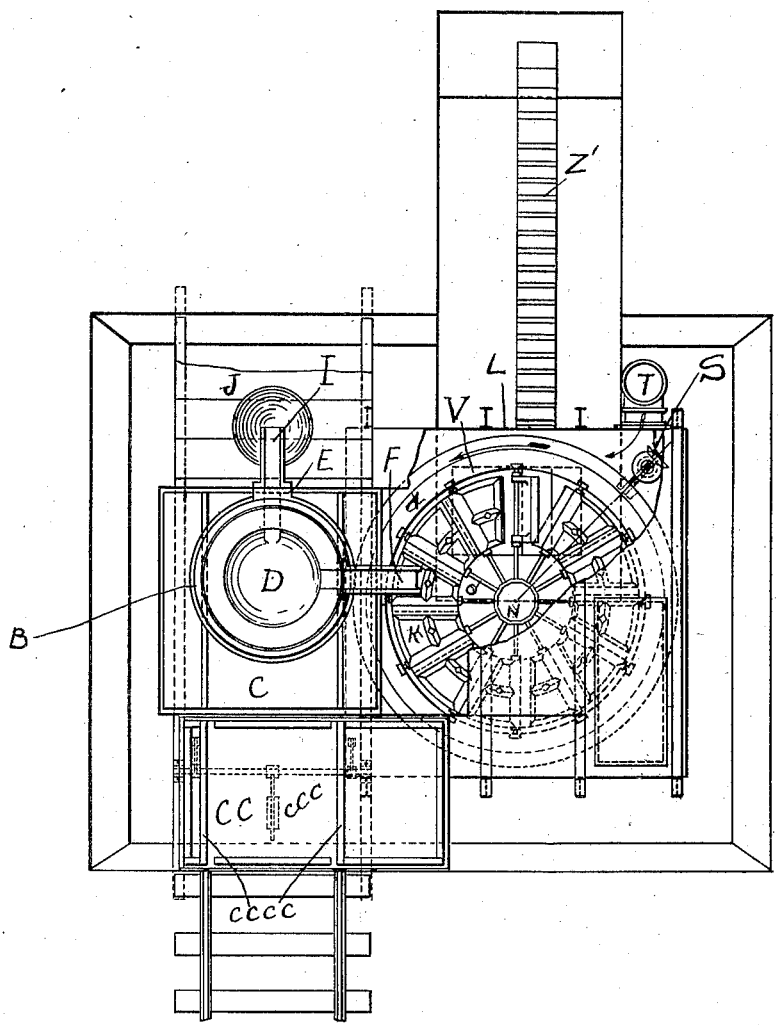
Figure 4:
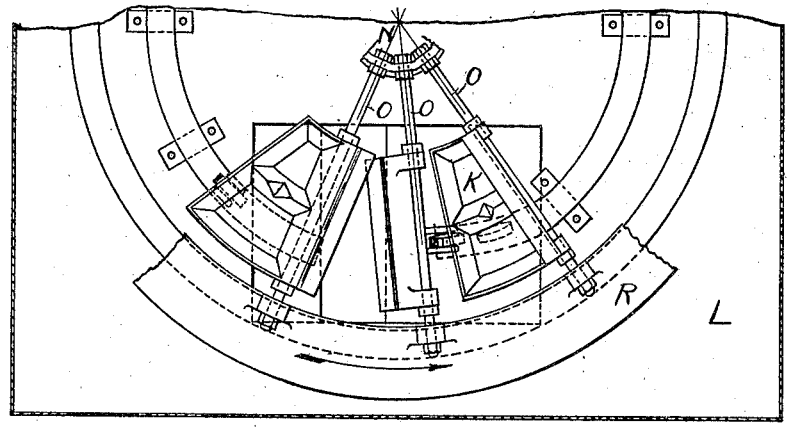
Figure 5:
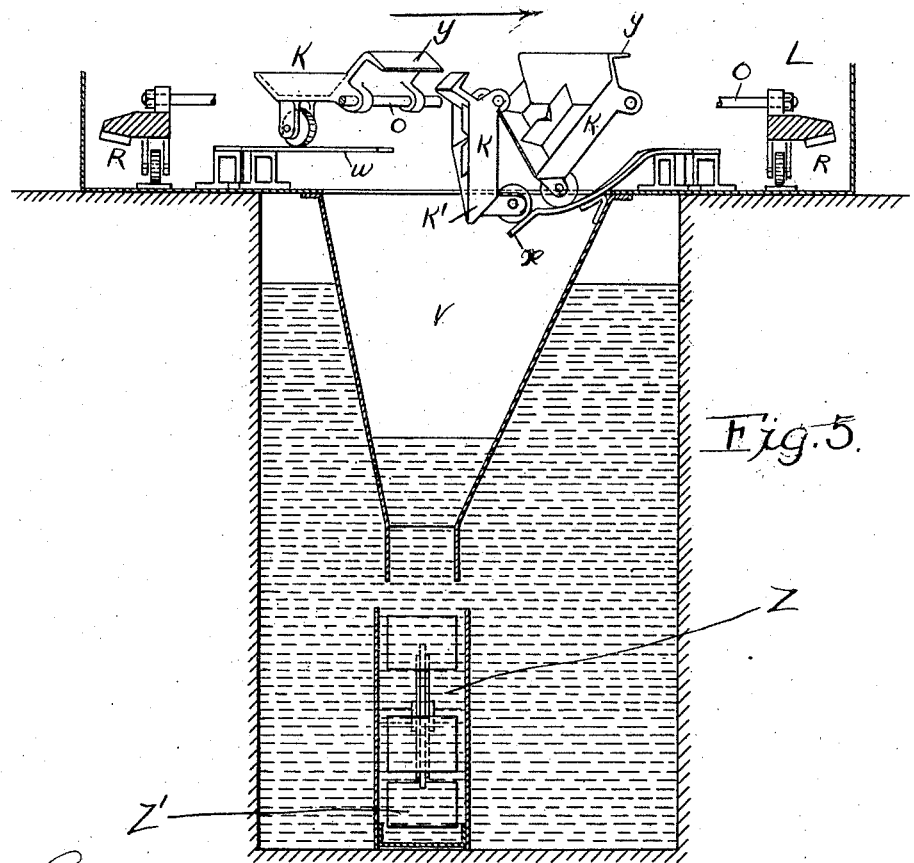

Figure 1, represents the complete furnace shown in section and demonstrates its mode of operation, also the method of disposing of the slags or waste material and utilizing these same slags to pre-heat the blast necessary for the smelting of the ores. Also the method of applying the water trap. Fig. 2, is another view showing the method of introducing the crucible into the chamber, the method of tapping for the bullion or results of the operation and the method of disposing of the slags without loss of blast and subsequently extracting them mechanically from the water well. Fig. 3, shows a plan of the whole furnace. Figs. 4 and 5 show in plan and vertical section, respectively, the method of discharging the chilled slags from the carriers and the water seal employed to keep the blast from escaping out of the wind chamber while discharging the slags into the elevator boot and elevator.

A— represents any ordinary stack to carry away the fumes.

AA— is a dust chamber for the collection of fine dust driven out of the furnace by the pressure of the blast.

AAA— is a door which is closed or opened at will and is the point at which the charge of ore, fluxes and fuel is introduced. It is built on a slant, as shown, in Fig. 1, so that should the necessity of "barring down" the furnace occur, this can be done conveniently and allow the operator to hold his bar in a vertical position, thus making the operation more convenient and with less risk of injuring the joints and rivets of the furnace jackets. This is not provided for in other furnaces.

B— is an ordinary furnace shaft, made either circular in shape, oblong or rectangular, depending on the requirements for special ores and the capacity of tonnage. This furnace shaft is water-jacketed in the usual manner, but has the distinction of being open at the top in lieu of being closed as in other furnace jackets, thus obviating the danger of explosion. This shaft has the further distinction of having no twyers or air inlets as are found in other furnaces.

BB— is one or more water inlets to cool the jacket.

BBB— is a pipe or other contrivance to carry away the waste or overflow of the water.

*b*— is an apron resting loosely on the top of the jacket for the purpose of preventing dust and particles of ore, fluxes or fuel from dropping into the water jacket.

*bb*— is a trough placed around the top of the outer jacket. This a useful device for catching and confining any sudden overflow of water, due to sudden overheating of the water or when using water inclined to foam.

*bbb*— is a connecting pipe which drains off the water from the trough and discharging same into the main water drain.

C— is a box or receptacle I call the crucible chamber. This receptacle is of sufficient size to allow ample room for the crucible with its attendant appurtenances described below. The furnace shaft either rests upon this box or is riveted thereon and has a hole in the top corresponding to the open space of the furnace shaft.

CC— is a door (Figs. 2 and 3) of such size as to admit the entrance of the crucible. This door is manipulated, *i. e.*, opened or closed, by the toggle and counterweight, (*c, c, c*,) in order to facilitate its manipulation. When the door is closed, it is made airtight by fastening it against the chamber by means of one or more suitable lugs. This door is so manipulated, that when it is open, it serves as a platform to introduce or take out the crucible conveniently. The door is also fitted with rails (*c, c, c, c*,) making a still more convenient method of rolling the crucible in or out.

D— is the crucible (sometimes called " inner hearth ") and constitutes the receptacle for the molten metals and refuse or slags and is the place where the separation is made of the commercial product from the valueless matter. This crucible is made of any shape or size consistent with the requirements of the nature of the smelting to be undertaken and it has the following features: (1.) It is an entirely independent section of the machinery and is in no way attached to the furnace shaft nor does it touch the crucible chamber at any place except at "e" hereinafter described. (2.) It is furnished with the slag spout (F) which acts as a conduit for the slags, which overflow from this conduit in a slow running stream, thus permitting the perfect settling of the valuable particles into the bottom of the furnace. While this system and device is used generally on copper furnaces, it differs materially inasmuch as it is inclosed inside of the chamber and is thus kept hot and thus avoids the common "clogging" that occurs on the standard types due to their exposure to the outside temperature. In standard plants this crucible is termed a "fore-hearth" and the furnace must have a crucible or bottom to collect the molten material before transferring it to the fore-hearth. By my method the molten material has no chance to cool with contact to the outer atmosphere and consequently the loss by metallic particles being mechanically carried away, is obviated. When the crucible is introduced into the chamber and placed in position for operating, it is run on the track (c, c, c, c,) to the movable platform (G). This platform (G) is then raised into position by the combination of gears (H) or any other suitable contrivance. The gears are operated until the crucible is raised to within one or more inches from the bottom of the furnace shaft. By this contrivance, the blast enters the furnace proper uniformly, at every point and gives a uniform temperature throughout the furnace, resulting in the entire furnace being clear and utilized for the purpose of smelting and obviates all furnace accretions, a thing which is not the case with other types of furnaces. Also, it accelerates the rate of smelting to upward of five times the rate of other types, resulting in greater economy of operation, less loss of merchantable metals through less volatilization and loss in flue dust, and a greater economy in power due to the low blast pressure required.

E— is a cast iron, or copper, tapping block. This is bolted or riveted to the crucible and the face of it is luted with clay and when the crucible is in place this block fits close to the side of the chamber which has the necessary slots cut into it to allow the bolts on the tapping block to appear on the outside, as well as the tapping slit. Nuts are placed on the bolts and tightened, thus making an air-tight joint and keeping the crucible rigid at the same time.

I— is an ordinary spout bolted onto the slot and is needed to conduct the valuable metal to the pot (J) of any other suitable receptacle. When the crucible fills with molten matte and slag, the latter runs off at the spout "F" and in a quiet and continuous flow, giving ample time to allow the valuable and heavier products to settle to the bottom, and through this method the slag runs off perfectly clear and drops onto the cars (K).

*Description of slag box or heating chamber.*—This constitutes a rectangular or circular iron box (L). I make it preferably rectangular in order to act as a baffle to the air and cause it to mix better. In the center of the box is a bearing (M) in which rotates a hub (N) preferably running on balls to lessen friction. From the hub spokes (O) radiate and upon these spokes the cars (K) are slipped and held in position by set collars, pins, or any other suitable device. The slag box is connected to the crucible chamber (C) at (P) and the slags drop into the cars as shown at (Q) Fig. 1. The cars are operated by the gear (R) and driven at a low rate of speed by the drive (S). The blast is introduced preferably, but not essentially at (T). The cars and gear run on any suitable track. These cars travel in a circle and when under the spout (F) they collect individually the molten slags. The blast, produced by any suitable blower, plays over these slags and, due to the large cubical contents of the slag box, travels slowly in the direction of the arrows, into the shaft of the furnace and absorb all practical available heat radiated from the slags, cooling and hardening them at the same time. As the blast travels to the shaft of the furnace it maintains the crucible (D) at a high temperature preventing the chilling of the mattes or copper. As the blast rises upward to enter the furnace shaft, it receives an additional heating from the powerful radiation of the space between the crucible and the furnace shaft.

(U) is a platform insulated with earth, or any other suitable material for the operator to stand on.

The cars are made preferably triangular in shape and shallow. The shape is such that they will fill the maximum space between the spokes; and they are made shallow because slags have a tendency to chill on their outer surface, thus forming an insulating medium and retain their interior heat for a long time. By making the cakes thin, a large area is exposed to the air, thus heating the air by absorption more readily and preventing the insulation mentioned above from taking place. They are discharged hard and practically cold.

The discharge is made in the following manner: After the cars make practically a complete circle, from the point where they receive the slags, they come over the hopper (V), where the track (W) terminates. Thus, meeting with no further rest, they turn on the spokes (O) and drop into a vertical position as shown by the car (X'), in Fig. 5, receiving at the same time a bump on the spring (X) which at the same time acts as a guide to bring the car back to a horizontal position. It will be noted that the cars have an overlap (Y) so as to prevent slag dropping between the cars while passing under the stream of slag. From the hopper (V) the slag falls into the elevator boot (Z) and is in turn taken therefrom by the elevator (Z') to any convenient point and discharged into any convenient receptacle, such as a car, a wheelbarrow or can be carried away by a stream of water. The hopper (V) and the boot (Z) are submerged in water confined in a suitable well, having a drain to maintain a constant water level. The Figs. 1, 2 and 4, show the level of the water lower in the hopper than in the well, thus demonstrating the efficacy of the water seal and counteracting any possibility of escape of blast from the slag box.

This method of extracting the slags may be modified either by a series of automatic valves or other methods which are being experimented on at present.

I claim as my invention:

1. In combination with a furnace shaft and crucible, a slag box, a slag receiving well connected with the box, conveying buckets in the box for receiving the slag from the crucible and conveying it to the well and automatic means for dumping the buckets.

2. A smelter comprising a furnace shaft, a crucible chamber connected therewith, a vertically movable platform in said chamber, a door for the chamber forming an extension of the platform when open and a crucible adapted to pass over the door onto said platform.

3. A smelter comprising a shaft having an open bottom serving as an air inlet, a crucible chamber connected with said bottom, a crucible in said chamber, means for moving the crucible toward and from the bottom of the shaft to adjust the air inlet to the shaft, said chamber having an outlet for the slag and means for introducing air through said outlet into the chamber so that said air is heated by the slag and the heat from the crucible.

4. A smelter comprising a vertical furnace shaft having an open bottom serving as an air inlet, a crucible chamber at the bottom of said shaft, a crucible in said chamber, means for moving the same vertically toward and from the bottom of the shaft to adjust the air inlet to the shaft, a slag box connected with the bottom of the crucible chamber, means in said box for receiving the slag from the crucible and conveying it to a delivery point, and means for passing air through the box into the crucible chamber.

In testimony whereof, I affix my signature in presence of two witnesses.

ALLEN R. PARTRIDGE.

Witnesses:
 OTTO HOUSING,
 H. P. DICKINSON.